UNITED STATES PATENT OFFICE.

JOSIAH JOHNSON, OF BROOKLYN, NEW YORK.

IMPROVEMENT IN HAIR-RESTORATIVES.

Specification forming part of Letters Patent No. 130,720, dated August 20, 1872.

*To all whom it may concern:*

Be it known that I, JOSIAH JOHNSON, of Brooklyn, in the county of Kings and State of New York, have invented a new and Improved Hair-Restorative; and I do hereby declare the following to be a full, clear, and exact description thereof, which will enable those skilled in the art to make and use the same.

This invention consists in a compound made of willow ashes, leather ashes, cocoanut, butter, tallow, and grape wine, which ingredients are thoroughly mixed and then boiled down to the consistency of pomatum in such a manner that a compound is obtained which is of great benefit to the growth of the hair, and which can be applied with ease and facility.

The proportion in which I mix the above-named ingredients together is about as follows: Ashes of willow, (by preference, weeping-willow,) one pound; ashes of leather, one pound; cocoanut, one-half pound; butter, four pounds; tallow, (by preference, beef kidneys,) two pounds; white grape wine, one quart. The whole mixture may be scented with bergamot or any other suitable perfume, and after the above-named ingredients have been thoroughly mixed the compound is boiled down to the consistency of pomatum, and then put up in suitable boxes, ready for the market.

My compound is of great advantage for the growth of the hair; it strengthens the skin on the head, and it effectually prevents the shedding of hair.

What I claim as new, and desire to secure by Letters Patent, is—

A hair-restorative, made of the ingredients above specified, and mixed together substantially in the manner and about in the proportion specified.

This specification signed by me this 29th day of July, 1872.

DR. JOSIAH JOHNSON.

Witnesses:
    WILLIAM C. LANE,
    W. HAUFF.